(Model.)

2 Sheets—Sheet 1.

E. W. QUINCY.
CHECK ROW CORN PLANTER.

No. 251,944. Patented Jan. 3, 1882.

Witnesses:
Fred G. Dieterich
P. C. Dieterich

Inventor:
Edmund W. Quincy
By W. B. Richards,
Atty (Model.)

2 Sheets—Sheet 2.

E. W. QUINCY.
CHECK ROW CORN PLANTER.

No. 251,944.

Patented Jan. 3, 1882.

Witnesses:
Fred. G. Dieterich
P. C. Dieterich

Inventor:
Edmund W. Quincy
By W. B. Richards
Atty

UNITED STATES PATENT OFFICE.

EDMUND W. QUINCY, OF DECATUR, ILLINOIS, ASSIGNOR TO CHAMBERS, BERING & QUINLAN, OF SAME PLACE.

CHECK-ROW CORN-PLANTER.

SPECIFICATION forming part of Letters Patent No. 251,944, dated January 3, 1882.

Application filed December 11, 1880. (Model.)

*To all whom it may concern:*

Be it known that I, EDMUND W. QUINCY, a citizen of the United States, residing at Decatur, in the county of Macon and State of Illinois, have invented certain new and useful Improvements in Check-Row Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1:
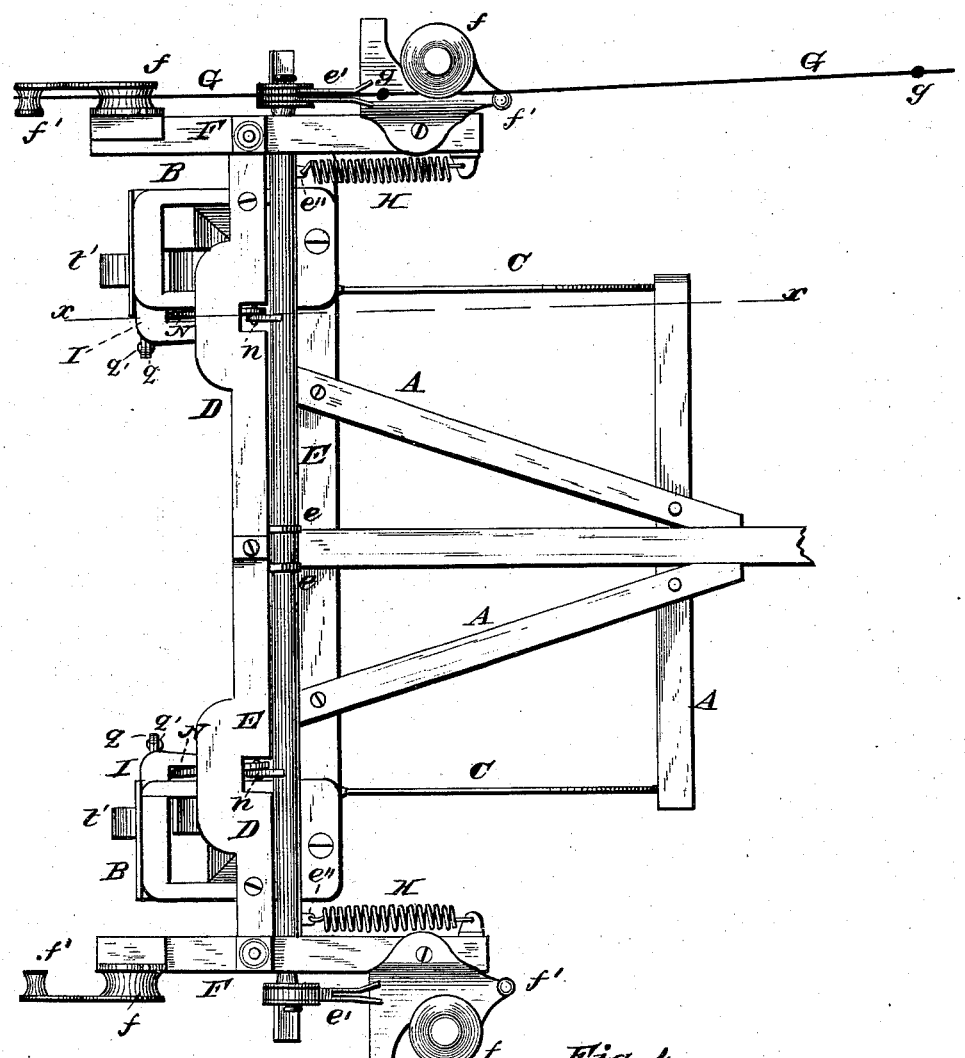
Figure 2:
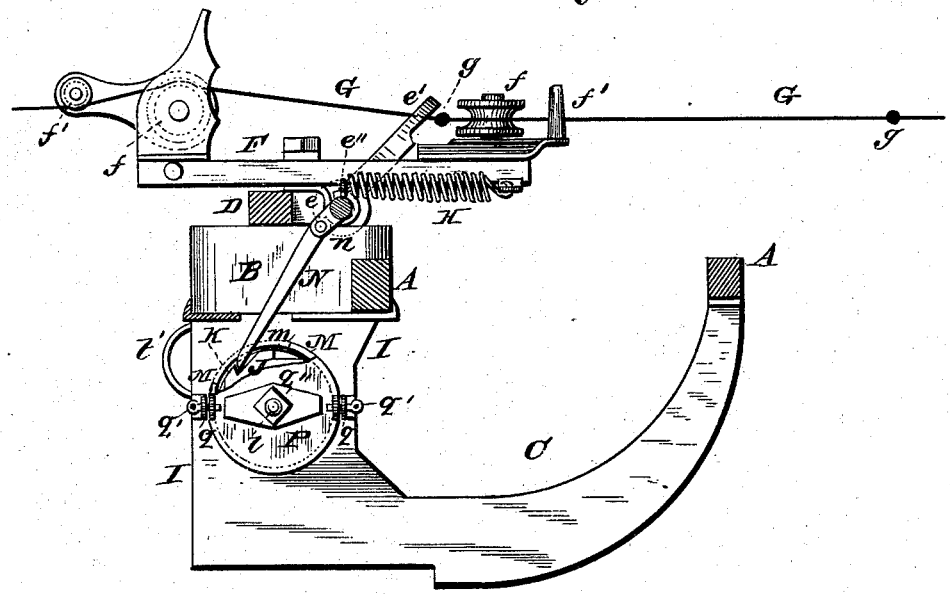
Figure 3:
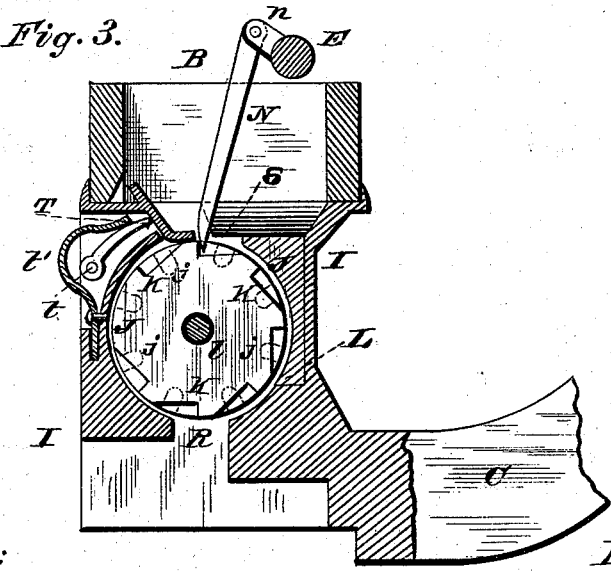

Figure 1 is a top plan of the forward frame of a corn-planter with my improvement. Fig. 2 is a sectional elevation in the line $xx$ in Fig. 1. Fig. 3 is an elevation, partly in section, of the seed measuring and discharging devices. Fig. 4 is a perspective of the seed-cup disk.

This invention relates to check-row corn-planters, or corn-planters designed to plant in cross-rows, or rows transverse to the path of the machine, of that class in which the seeding devices are operated by a knotted wire or rope stretched across the field.

The invention consists in constructions and combinations hereinafter described, and set forth in the claims hereto annexed.

The drawings show the forward frame of a corn-planter (designated by letters A) and seed-boxes and runners, (designated respectively by the letters B C.)

D is a bar placed transversely on the planter, and extending beyond the seed-boxes B.

E is a rock-shaft journaled in bearings $e$ to the bar D, and has a forked lever, $e'$, on each of its ends. A head or cross-bar, F, is fixed to each end of the bar D, which heads are provided at their ends with guide-pulleys $f$ and guards $f'$, for the knotted check-row chain G.

H is a spiral spring connected at one end with an arm, $e''$, on the shaft E, and at its other end with one of the heads F.

The foregoing parts, described by reference-letters, are parts of an ordinary check-row corn-planter of the class shown, and may be constructed in any usual manner.

A standard, I, connects the seed-box B with the runner C.

J is the seed-cup wheel or disk, consisting of a cylinder with a series of radial chambers or seed-cups, $j$, in its periphery, and a corresponding number of ratchet-teeth, K, also in its periphery, but at one end of said cylinder, as shown at Fig. 4. The seed-cup wheel J is journaled on a bolt, $l$, in a recess, L, in the standard I, with the cups $j$ beneath the seed-box and the ratchet-teeth K exterior to the standard. A flange, M, projects from the peripheral wall of the recess L, and surrounds the projecting end of the wheel J, and has an opening, $m$, in its upper side, through which a pawl, N, may pass to engage with the ratchet-teeth K. The upper end of the pawl N is hinged to an arm, $n$, on the shaft E. A cap, P, covers the outer end of the wheel J, and is held in place by ears $q$ with keys $q'$, and by a nut, $q''$, on the bolt $l$, which bolt passes through the cap-plate P. By removing the nut $q''$ and keys $q'$, the cap P may be removed for access to the seed-wheel J to clean it, or to substitute other wheels with seed-cups of different capacities, or for any other purposes.

The recess L has an opening, R, in the lower side of its peripheral wall, which opening communicates with the open rear end of the runner C. The recess L has also an opening, S, in the upper side of its peripheral wall, which communicates with the interior of the seed-box. T is a cut-off pivoted or hinged at $t$, and held by a spring, $t'$, which permits it to yield upward in the usual manner.

In operation the planter is drawn along the knotted check-row chain, and the knots $g$ act successively on the forked levers $e'$ to oscillate them backward in the usual manner. Oscillating the levers $e'$ and the rock-shaft E backward will force the pawls N against the ratchet-teeth on the seed-wheels J and give a partial rotation to each seed-wheel, which partial rotation will bring one of the seed-cups over the discharge-opening R and allow it to discharge its contained seed. The knot $g$, escaping from the forked lever $e'$, will release the rock-shaft and permit the spring H to restore the rock-shaft and pawls N to their normal positions and ready for the action of the next knot g, thus giving an impulse or partial rotation to the seed-wheels at each backward partial rotation of the rock-shaft, and thereby imparting an intermittent rotary motion in one direction to said seed-wheels, and discharging a measured quantity of seed at each movement of said seed-wheels.

It is not deemed necessary to describe the action of the cut-off nor the manner in which the seed-cups are filled, as both operations are usual in planters having similar seed-wheels.

The lower part of the seed-wheels are close above the runners C, and the seed is discharged from the seed-wheels into and through the open rear ends of the runners, and being discharged thus close to the ground will prevent scattering the seed by the forward motion of the planter, and thereby dispense with the common lower discharge-valve.

Seed-cup wheels rotating in horizontal planes, and having axial seed-cups or cups parallel with the axis of the wheel, may be used instead of the seed-cup wheels herein described, and the pawl be readily and easily arranged to impart to such horizontal wheels an intermittent rotary motion in one direction.

What I claim as new, and desire to secure by Letters Patent, is—

1. In a corn-planter, in combination with a seed-cup wheel having a ratchet-wheel formed in one of its ends and periphery, and with a knotted check-row chain or wire, a rock-shaft with a pawl adapted to impart an intermittent rotary motion in one direction to the seed-cup wheel, substantially as and for the purpose specified.

2. In combination with the standard I, connecting the seed-box and runner, and with the seed-wheel located in the standard I, the cap P, adapted for removal for access to and removal of the seed-wheel, substantially as and for the purpose specified.

3. In combination with a rock-shaft adapted to receive an oscillating motion on its longitudinal axis from a knotted check-row cord or wire, a pawl, N, hinged to said rock-shaft, and adapted to act on a seed-wheel having radial seed-cups in its periphery, and ratchet-teeth on its end and periphery, substantially as and for the purpose specified.

4. In combination with the runners and seed-boxes and seed-wheels having radial peripheral seed-cups and peripheral ratchet-teeth, the rock-shaft having a pawl at each end for imparting movement to the seed-wheels, and forked levers for receiving movement from a knotted check-row chain or wire, substantially as and for the purpose specified.

In testimony whereof I affix my signature in presence of two witnesses.

EDMUND W. QUINCY.

Witnesses:
WILLIAM M. BOYD,
HENRY A. WOOD.